Figure 1:
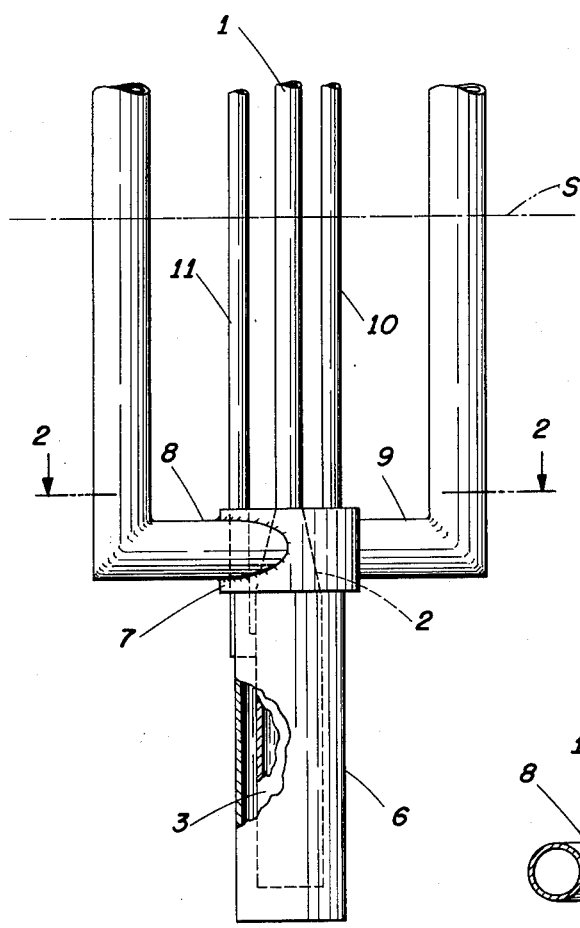

Nov. 15, 1955 W. L. YOUNG ET AL 2,723,659
SUBMERSIBLE BURNER
Filed Jan. 30, 1951

INVENTORS
WALTER L. YOUNG
CLARENCE J. DOUGLAS
RUDOLPH J. STENGL
FLOYD B. BEDWELL

BY
ATTORNEY ns to the c# United States Patent Office 2,723,659
Patented Nov. 15, 1955

2,723,659
SUBMERSIBLE BURNER

Walter L. Young, Clarence J. Douglas, Rudolph J. Stengl, and Floyd B. Bedwell, Tulsa, Okla., assignors to Ozark-Mahoning Company, Tulsa, Okla., a corporation of Delaware Application January 30, 1951, Serial No. 208,468

1 Claim. (Cl. 126—360)

This invention relates to the combustion of fuel beneath the surface of a liquid and is particularly directed to an improved burner for effecting such combustion and discharge of the combustion products into the liquid for transmission thereinto of the heat of combustion without excessive localized heating of the liquid.

For concentration processing of inorganic solutions, for example heating a brine containing Glauber's salt or the like to concentrate it, a relatively simple burner is normally entirely satisfactory as demonstrated in U. S. Patents 2,086,902 issued July 13, 1937, and 2,159,759 issued May 23, 1939, to Henry W. Doennecke et al. A submersible burner such as illustrated in those patents comprises essentially a cylindrical metal tube open at its lower end and having a substantially conical expansion chamber at its upper end into which a combustible mixture is discharged axially from a supply pipe for combustion in the tube and discharge of the combustion products directly from its lower end into the liquid to be concentrated. However when employed for processing solutions containing organic or other materials unstable in the presence of relatively intense heat localized portions of the liquid may become too hot with resulting decomposition despite the fact that the average temperature of the liquid body as a whole may remain well below the temperature at which decomposition normally occurs. Thus for example in the extraction of water from milk some concomitant chemical action may cause discoloration of the product, probably as a result of contact of small bodies of the milk with hot burner surfaces and/or hot combustion products issuing from the lower end of the burner causing partial decomposition of some organic constituent of the milk. Hence while water may be extracted from the milk quite rapidly without heating the body of milk as a whole to a temperature in excess of its normal boiling point the resulting such discoloration militates against use of burners of that character for milk concentration.

Submersible burners have been suggested including a combustion chamber provided with a refractory or heat-insulating lining and/or covering for preventing contact of the liquid being heated with hot surfaces of the combustion chamber, but even these burners afford direct contact between the liquid and the flame and/or hot combustion products resulting in at least some localized heating of the liquid, while their refractory linings or coverings are apt to spall with consequent contamination of the liquid by particles of the refractory.

It is therefore a principal object of the invention to provide an improved submersible burner which is more satisfactory for use in concentrating certain classes of liquids than the known burners to which reference has been made.

It is a further object to provide a novel submersible burner in which when in operation a moving stream of relatively cool gaseous fluid surrounds the combustion chamber wall in direct contact with its exterior while enclosed within a metallic jacket which excludes the liquid in which the burner is submerged from contact with that wall whereby not only is some heat removed from the chamber wall but the combustion products on discharge from the chamber into the liquid are likewise excluded from direct contact therewith by the relatively mildly heated gaseous fluid of said stream which initially forms a gaseous envelope about the combustion products prior to mixing with the latter. Contact between the fluid and intensely heated metal surfaces and/or combustion products is thereby inhibited and the maximum temperature of any portion of the liquid is confined within reasonable limits without detracting from the overall efficiency of transmission of the heat of combustion to the body of liquid as a whole; the said maximum thus never greatly exceeds the average temperature of the entire body of liquid and volatile constituents of the latter are readily vaporized without charring or other heat decomposition of the remainder.

A still further object is to provide a method of removing by vaporization volatile components of a liquid containing components substantially non-volatile but relatively heat-unstable or readily decomposed when highly heated, whereby the temperature may be maintained well below the decomposition temperature of the latter without impairing the efficiency of vaporization of the volatile constituents thus enabling concentration of the non-volatile ones without appreciable change in their chemical composition, charring or objectionable discoloration of the final product.

Figure 2:
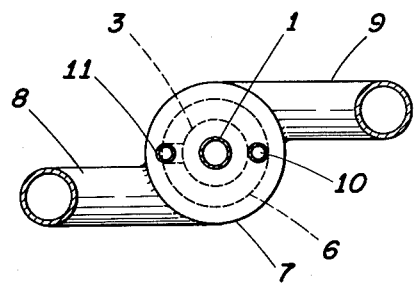

Other objects, purposes and advantages of the invention will hereinafter more fully appear or will be understood from the following description of a burner adapted for attainment of its objects in accordance with the method it comprehends, said burner being illustrated in the accompanying drawing, in which:

Fig. 1 is a fragmentary side elevation and
Fig. 2 is a fragmentary horizontal section on the line 2—2 in Fig. 1.

Referring now more particularly to the drawing the burner comprises a combustible mixture supply pipe 1 which when the burner is in operation extends beneath the surface S of a body of liquid to be heated and supports at its lower end a frusto-conical expansion chamber 2 to which is secured a substantially cylindrical combustion chamber tube 3, all these parts preferably being metal and united by welding. The combustion chamber tube is open at its lower end for discharging the combustion products directly into the liquid in which it is submerged and is surrounded by a metal substantially tubular air jacket 6 likewise open at its lower end which terminates a little below the end of the combustion chamber. At its upper end the jacket 6 is welded or otherwise connected to a substantially cylindrical hollow casing or drum 7 into which air is introduced during the operation of the burner through diametrically opposed ducts 8 and 9 preferably positioned tangentially with respect to the drum where they enter the latter, their upper ends (not shown) being connected to a blower or other suitable apparatus for continuously supplying air or other gaseous fluid thereto.

For facilitating observation of the temperature within the burner a thermocouple tube 10 may be extended into the jacket 6 and an igniter tube 11 with which may be associated mechanism (not shown) for initiating combustion of the combustible mixture supplied the burner through the pipe 1 is desirably provided although not essential as other means for accomplishing the functions of these tubes may be utilized if desired, these tubes, thermocouple and igniter forming no part of the present invention.

In operation the burner is submerged below the surface S of a liquid such as milk or the like, a combustible mixture of gas and air continuously supplied through the pipe 1 to the expansion and combustion chambers is ignited and air concurrently introduced through ducts 8 and 9 into drum 7 for passage through jacket 6 and into the fluid through the lower end of the latter. The hot combustion products then issue from the lower end of the combustion chamber at a temperature somewhat modified by the conduction of heat through the combustion chamber walls and its absorption by the air passing through the jacket 6. This so-called "secondary" air, introduced tangentially into the casing 7 at relatively high velocity follows a generally helical path through the jacket, exercises a pronounced cooling effect on the combustion chamber wall and prevents excessive heating of the jacket, the tangential arrangement of the ducts insuring complete scouring action by the air stream in intimate contact with its confining surfaces and preventing creation of isolated pockets of relatively motionless air which might permit localized heating; channeling of the stream in a path or paths between or around such pockets is also thereby eliminated.

The partially heated secondary air, as it issues from the lower end of the jacket 6 initially forms a substantially continuous cylindrical envelope about the stream of combustion products discharged from the combustion chamber and prevents their direct contact with the liquid until after the air and combustion products have been largely intermingled and a portion of the heat of the latter absorbed by the former, thus reducing the maximum temperature in any part of the mixture but not appreciably affecting the total heat carried by the gaseous discharge considered as a whole and including both the combustion products and supplemental air issuing from the jacket. Obviously this discharge, initially moving in a generally vertical direction into the relatively dense liquid has its downward motion rapidly decelerated by its bouyancy in the liquid and as that motion ceases, or perhaps somewhat earlier, it breaks into a myriad of minute bubbles which thereafter quickly rise through the liquid to its surface for release into the atmosphere, conduction to a condenser for recovery of condensible components or otherwise suitable disposition of the gases and vapors of which they are formed.

During passage of the bubbles through the liquid in direct contact therewith heat is of course rapidly transferred to it and soon after initiation of the burner operation a substantial temperature equilibrium is attained between the liquid and the mixture of combustion products and warmed air initially forming the bubbles. Volatilized constituents of the liquid are consequently entrained in substantial proportion with the gaseous constituents of the bubbles and removed therewith as vapors, thus concentrating in the liquid its relatively non-volatile components.

The extraction of volatile constituents by the combined effects of the heat of combustion and mechanical entrainment independently of vaporization ascribable to the heating usually results in the said temperature equilibrium being attained at several degrees below the normal boiling point of the liquid. Thus a solution that normally boils at 100° C. and at about 89° C. with the submersible burner disclosed in the aforesaid patents using only the theoretical amount of combustion air has its boiling point further lowered in proportion to the amount of secondary air supplied through jacket 6 of the herein disclosed burner; for example with 500% of such air over the said theoretical quantity the boiling point becomes 60° C. or thereabouts at which temperature heat absorbed in volatilization balances that imparted to the liquid as a result of combustion of the fuel and substantially this temperature equilibrium persists until the desired concentration of the liquid is reached.

Thus in accordance with the invention contact between any part of the liquid and solid surfaces or gases heated to a temperature above the decomposition temperature of any of its constituents is inhibited, and volatilization or fractional distillation of its volatile constituents is rapidly and efficiently carried out without caking or scaling of the container walls or other confining surfaces which do contact the liquid and without effecting appreciable chemical change of any of its constituents, charring or other objectionable results.

In consequence, with the aid of our improved burner and in accordance with our method milk and other liquids containing organic and/or other relatively heat-unstable constituents may be concentrated or "condensed" by extraction of volatiles in a manner comparable to distillation and at ordinary atmospheric pressures but without discoloration or other contamination which normally accompanies their concentration with the aid of apparatus including a submersible burner of conventional type, and without the deposition of solids as cake or scale on heated surfaces which occurs with some submersible burners and in stills or evaporators heated by external means.

It will of course be appreciated that while we have herein described with considerable particularity one burner embodying our invention as well as the practice of our improved method with the assistance thereof we do not desire or intend to be limited or confined thereto or thereby in any way as changes and modifications in the form, structure, arrangement and relationship of the burner parts as well as in the several steps of our method will readily occur to those skilled in the art and may be utilized if desired without departing from the spirit and scope of the invention as defined in the appended claim.

Having thus described our invention, we claim and desire to protect by Letters Patent of the United States:

A submersible burner comprising means forming an elongated substantially cylindrical combustion chamber and providing at one end a port for discharge of combustion products from the chamber into a liquid in which the burner is adapted to be submerged and at the other end a frusto-conical expansion chamber communicating at its larger end with the combustion chamber, means connected with the smaller end of the expansion chamber for continuously supplying therethrough to the combustion chamber for combustion therein a gaseous combustible mixture, a substantially cylindrical jacket surrounding and spaced outwardly from and in heat-exchanging relation with the combustion chamber forming means and defining therewith adjacent one of its ends a substantially annular discharge port surrounding said first port, and means communicating with the other end of the jacket for continuously supplying to the jacket for passage through said discharge port a gaseous fluid adapted to exclude the liquid from contact with said combustion products adjacent said first port, said last mentioned means including a substantially cylindrical drum of larger diameter than the jacket surrounding the expansion chamber and a pair of ducts disposed in diametrically opposed tangential relation to the drum in a plane substantially normal to its axis.

References Cited in the file of this patent

UNITED STATES PATENTS

| 1,369,602 | Amsler | Feb. 22, 1921 |
| 1,656,907 | Bansen | Jan. 24, 1928 |
| 1,798,785 | Carter | Mar. 31, 1931 |
| 1,950,980 | Frisch | Mar. 13, 1934 |
| 2,118,479 | See et al. | May 24, 1938 |
| 2,159,759 | Doennecke et al. | May 23, 1939 |
| 2,418,566 | Arnhym | Apr. 8, 1947 |
| 2,458,541 | Urquhart | Jan. 11, 1949 |
| 2,486,481 | Kissam | Nov. 1, 1949 |
| 2,506,853 | Berg et al. | May 9, 1950 |

FOREIGN PATENTS

| 363,452 | Germany | Nov. 9, 1922 |